United States Patent [19]
Shirley

[11] Patent Number: 5,208,787
[45] Date of Patent: May 4, 1993

[54] RODENT CONTROL BY SOUND WAVES

[76] Inventor: Gerald C. Shirley, P.O. Box 1101, Osage Beach, Mo. 65065

[21] Appl. No.: 818,642

[22] Filed: Jan. 7, 1992

[51] Int. Cl.⁵ .......................................... H04B 11/00
[52] U.S. Cl. .................................................. 367/139
[58] Field of Search ............ 367/139, 168; 116/22 A; 43/124; 310/26; 340/384 E, 384 R

[56] References Cited

U.S. PATENT DOCUMENTS

| | | | |
|---|---|---|---|
| 2,572,313 | 10/1951 | Burns, Jr. .............................. | 310/26 |
| 4,097,838 | 6/1978 | Fiala ..................................... | 367/139 |
| 4,409,553 | 10/1983 | Slough et al. ......................... | 324/445 |
| 4,414,653 | 11/1983 | Pettinger ............................. | 367/139 |
| 4,802,057 | 1/1989 | Patterson et al. .................... | 116/224 |

*Primary Examiner*—Ian J. Lobo
*Attorney, Agent, or Firm*—Dennis T. Griggs

[57] ABSTRACT

A sound wave generator is effective for producing ultrasonic sound wave vibrations as well as low frequency vibrations which are offensive to rodents. A wiring conductor which serves as a sonic radiator is attached to an end portion of a solenoid rod which is reciprocated by a coil which is energized by alternating current power. The solenoid rod is permitted to vibrate within a hollow spool, and the sonic radiator is mechanically coupled to the solenoid rod by a high compliance, conductive metal spring. Ultrasonic sound waves are produced by forming the solenoid rod of a ferromagnetic material which is characterized by magnetostriction in the presence of an alternating magnetic field. The amplitude of sound wave vibration is intensified by selecting the length and diameter of the solenoid rod so that its natural frequency of vibration is in harmony with either the pulse frequency of the electromagnetic driving force, or alternatively, the frequency of ultrasonic sounds produced by magnetostriction. The sound wave generator circuit includes a pseudo-random signal generator for randomly gating the conduction of electrical alternating current through the solenoid coils during a pulsing duty cycle.

11 Claims, 2 Drawing Sheets

RODENT CONTROL BY SOUND WAVES

FIELD OF THE INVENTION

This invention is related generally to non-chemical rodent control systems, and in particular to apparatus for generating sound waves which are offensive to rodents.

BACKGROUND OF THE INVENTION

Sound waves having frequencies of about 60 Hz are known to be offensive to rodents such as rats and mice. Conventional sound wave generators utilize electromagnetic coils to cause a solenoid to vibrate at various frequencies for the purpose of producing offensive sound waves. Such sound waves and vibrations have been coupled to the ground through pipe probes and anchor tubes. The vibrations have also been coupled to building structures and to the ground safety conductor of AC power distribution wiring in building structures. Such systems typically generate mechanical vibrations and emit sound waves at frequencies which range from about 60 Hz to several hundred Hz. The pulse generators are usually controlled to apply vibrations at a 60 Hz rate for a duty cycle of one to two minutes followed by a rest period of one or two minutes.

DESCRIPTION OF THE PRIOR ART

A sound wave generator which produces sound waves at a frequency offensive to rats and mice is disclosed in U.S. Pat. No. 4,414,653 which is assigned to Gerald C. Shirley. The circuitry of that device includes coils which are pulsed with 60 Hz alternating current power which causes a solenoid bar to reciprocate and vibrate at a 60 Hz rate within a hollow spool. The vibrations produced by the solenoid bar are mechanically coupled to various sonic radiators, including the ground wire of an AC power distribution system.

According to U.S. Pat. No. 4,414,653, the solenoid bar is intersected by a tubular bore or longitudinal groove through which the ground wire is extended. The vibrations are coupled to the ground wire by frictional engagement of the vibrating bar against the wire conductor. This arrangement is effective for coupling the driving pulse component, 60 Hz, to the AC power distribution ground conductor. However, higher frequency components are suppressed by the damping effect of the frictional engagement. An analysis of harmonic components has shown that for a pulse rate of 60 Hz, the next higher order odd harmonic component (180 Hz) has an amplitude of not more than about 11 percent of the driving component with the amplitude of the higher order odd harmonics (300 Hz and higher) being negligible. This indicates that higher frequency vibrations which are offensive to rodents are not being utilized effectively. In particular, sound vibrations exceeding 20,000 Hz are not being effectively transmitted by conventional solenoid devices.

A related limitation on the effectiveness of conventional rodent control devices is that the pulsing activity which produces the offensive vibrations is periodic and predictable. It is believed that noise vibration which is offensive to rodents will be more effective if it occurs randomly during a pulsing duty cycle, so that it is not predictable and does not form a pattern which can be recognized and discounted or ignored by rodents that become accustomed to such noise because of its regularity.

OBJECTS OF THE INVENTION

A general object of the present invention is to provide an improved sound wave generator which is effective for producing sound wave vibrations at various frequencies, including vibrations at ultrasonic frequencies as well as low frequency vibrations, and for efficiently coupling the sound wave vibrations to sonic radiators.

Another object of the present invention is to provide an improved sound wave generator of the character described, in which sound wave vibrations across a wide frequency spectrum are effectively coupled to a sonic radiator such as the ground safety conductor of AC power distribution wiring.

Still another object of the present invention is to provide an improved sound wave generator of the character described, in which the amplitude of sound wave vibrations is intensified at a selected frequency which is offensive to pests such as rodents and insects.

Yet another object of the present invention is to provide an improved sound wave generator of the character described, which has the capability of generating sound wave vibrations at a frequency which is offensive to rodents and which occur randomly during a pulsing duty cycle so that the offensive sound wave vibrations are not predictable and do not form a pattern which can be recognized and discounted or ignored by rodents.

SUMMARY OF THE INVENTION

According to one aspect of the present invention, the damping of sound wave vibrations caused by frictional engagement between a vibrating solenoid rod and a wiring conductor is eliminated. The wiring conductor which is to serve as the sonic radiating structure, for example, the ground safety conductor or the neutral conductor, is attached directly to an end portion of the solenoid rod, instead of being extended longitudinally through a bore or groove formed in the solenoid rod. This arrangement permits the efficient conduction of sound waves along the longitudinal axis of the solenoid directly to the sonic radiator. The solenoid rod is reciprocated within a hollow spool by an alternating magnetic field which reverses at a rate of 60 Hz. The alternating magnetic field is produced by coil windings which are electrically energized by alternating current power at a fundamental operating frequency of 60 Hz.

In one embodiment of the invention, the fundamental driving component is efficiently coupled to the sonic radiating structure through a compliant spring. The compliant spring decouples the mechanical resistance of a stiff sonic radiator and permits the solenoid rod to vibrate freely within the hollow spool.

Preferably, the solenoid rod is made of a ferromagnetic metal which undergoes magnetostriction in the presence of an alternating magnetic field. When magnetostriction occurs, sound waves at ultrasonic frequencies are generated within the rod as the magnetic domains of the ferromagnetic metal alternately align with the north and south magnetic poles produced by the alternating magnetic flux field. Since the ultrasonic vibrations are generated along the longitudinal axis of the rod, the ultrasonic vibrations are efficiently transmitted to the sonic radiating structure. Consequently, sound wave vibrations are produced at two principal frequencies, namely the relatively low driving frequency of the mechanical solenoid bar as it reciprocates and vibrates in response to the alternating magnetic fields which are reversed at a rate of 60 Hz, and the relatively high frequency of the (ultrasonic) sound wave component produced by the magnetostriction effect.

According to another aspect of the invention, the amplitude of sound wave vibration is intensified at a selected frequency which is offensive to rodents. This is achieved by selecting the length and diameter of the solenoid rod so that its natural frequency of vibration is in harmony with the driving frequency of the electromagnetic field. Alternatively, its length and diameter are selected so that its natural frequency is in harmony with the high frequency of ultrasonic sounds produced by magnetostriction. According to this arrangement, the amplitude of vibration is increased and vibrations having maximum amplitude are produced at a selected resonant frequency.

According to yet another aspect of the invention, the sound wave generator circuit includes a pseudo-random signal generator which is connected within the circuit for randomly gating the conduction of electrical alternating current through the solenoid coils during a pulsing duty cycle. According to this arrangement, the low frequency and high frequency sound wave vibrations will occur randomly during the duty cycle so that the offensive sound wave vibrations are not predictable and will not form a noise pattern which can be recognized and discounted or ignored by rodents.

The novel features of the invention are set forth with particularity in the claims. The invention will best be understood from the following description when read with reference to the accompanying drawings.

DETAILED DESCRIPTION OF THE PREFERRED EMBODIMENT

Figure 1:
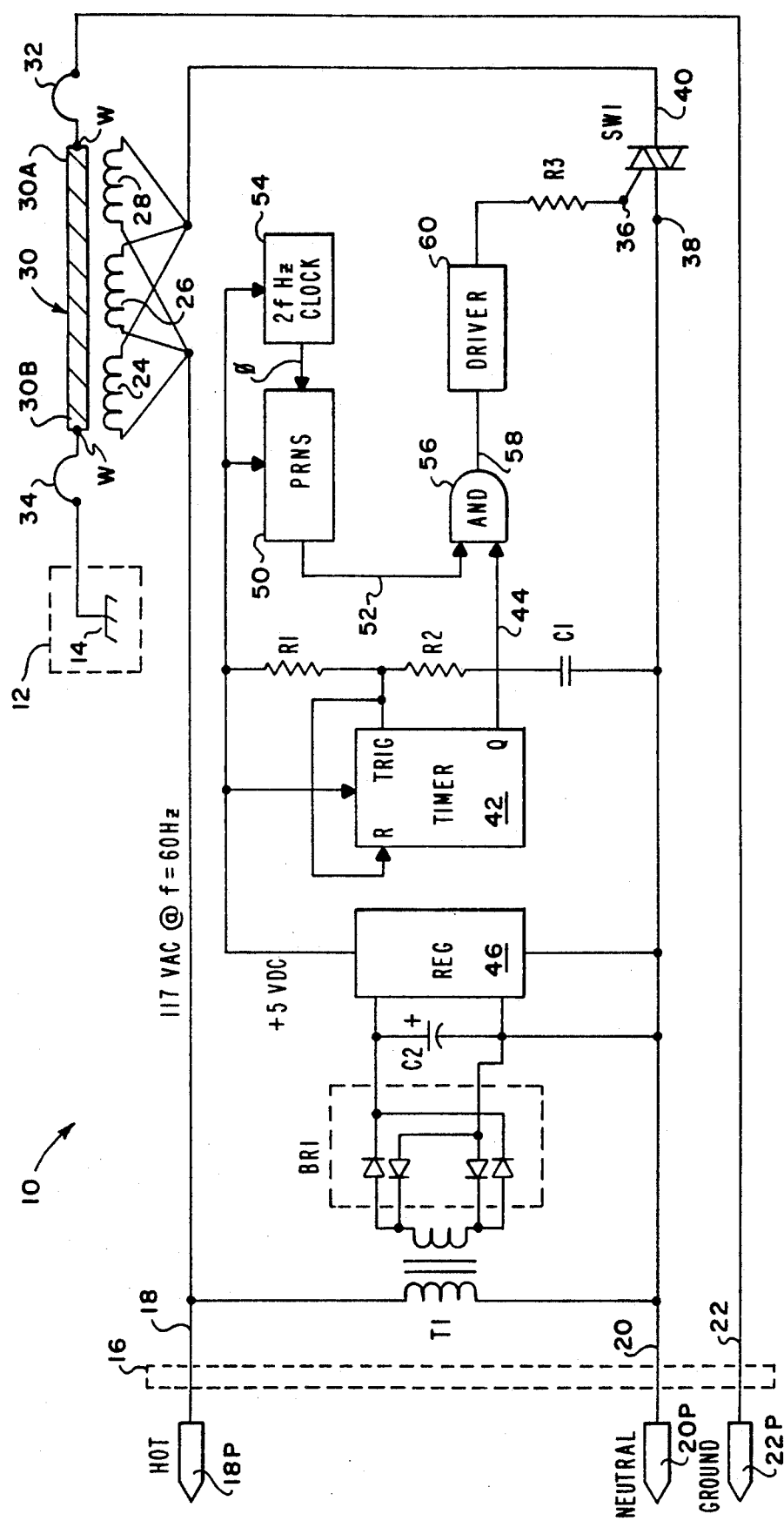
FIG. 1 is a simplified circuit diagram showing the preferred embodiment of the present invention.

In the description which follows, like parts are indicated throughout the specification and drawings with the same reference numerals, respectively.

The rodent control device 10 of the present invention is enclosed within a housing 12, preferably as shown in my U.S. Pat. No. 4,414,653, which is incorporated herein by reference for all purposes. The housing 12 is mechanically attached to an external sonic radiator 14, which may be, for example, a building structure, an earth ground rod, a water pipe or a gas pipe.

The rodent control device 10 receives electrical power through an electrical cord 16 which includes a hot power conductor 18, a neutral (common) power conductor 20 and a ground safety conductor 22. The hot, neutral and ground safety conductors are terminated by prongs 18P, 20P and 22P, respectively, within a service plug. The prongs are adapted for insertion into electrical connector jacks within an AC power service receptacle. The AC power service receptacle is connected to an AC wiring distribution system having hot, neutral and ground conductors attached to the connector jacks for supplying AC operating power at 117 VAC, 60 Hz from a domestic utility company.

With reference to FIG. 1, sound waves at a frequency offensive to rodents and other pests are generated by three 24 ohm coils 24, 26, 28 which are substantially identical in construction. The coils are connected in parallel circuit relation with each other, and in series with the hot wiring conductor 18. Each coil 24, 26 and 28 includes multiple turns of copper wire wound on a hollow spool.

An elongated solenoid bar 30 extends through the hollow spool inside of each coil winding, and provides a high magnetic permeability path for the conduction of electromagnetic flux produced by the coils 24, 26, 28. According to one aspect of the invention, the elongated solenoid bar 30 is constructed of a ferromagnetic metal, such as iron, which undergoes magnetostriction in the presence of an alternating magnetic field.

Preferably, the solenoid bar 30 is substantially radially spaced and centered within the spool bore, whereby it can reciprocate and vibrate freely within the spool.

According to another aspect of the invention, the ground safety conductor 22 is mechanically attached to one end portion 30A of the solenoid bar by a spring 32 which is constructed of a resilient, conductive metal, for example spring steel. Preferably, the spring 32 has relatively high compliance to deflection forces as compared with the ground safety conductor 22.

Depending on the stiffness of the ground safety conductor 22, compliance to deflection forces can be provided by a single loop or turn of the safety conductor 22, and a separate spring 32 is not needed. In all embodiments, however, the connecting end portion of the safety conductor 22 or spring 32 is attached directly to the end of the solenoid bar, preferably in alignment with its longitudinal axis. A direct connection W is made, preferably by brazing, welding or soldering.

The opposite end 30B of the solenoid bar 30 is coupled to an external sonic radiator 14 by a resilient spring 34 which has the same construction and properties as the resilient spring 32. High frequency and low frequency sound waves generated by the reciprocating solenoid bar 30 are conducted efficiently through the springs 32, 34 to the sonic radiators. The velocity of propagation of the sound waves through the sonic radiators is approximately 5,000 meters per second. Attenuation and suppression of low frequency and high frequency sound waves generated by the vibrating solenoid rod are essentially avoided by minimizing frictional engagement between the solenoid rod and the spool, while conducting the generated sound waves along a longitudinal wave front directly to the sonic radiators. Frictional resistance is further reduced by constructing the spool of a material having a low coefficient of friction, for example tetrafluoroethylene (TFE) as sold by DuPont under the trademark TEFLON.

The coils 24, 26 and 28 are energized by 117 volts AC at the rate of 60 Hz in response to conduction of a power switch SW1. The power switch SW1 is preferably a gate controlled triac having a gate terminal 36, an unswitched terminal 38 and a switched terminal 40. The switched and unswitched terminals of the triac switch SW1 are connected in electrical series relation with the hot power conductor 18 and the neutral conductor 20, respectively. When the power switch SW1 is conducting, alternating current power is applied to the coils at the rate of 60 Hz, with the electromagnetic field and direction of flux reversing at the same rate. The solenoid core 30 reciprocates within the spool and vibrates at 60 Hz.

Figure 2:
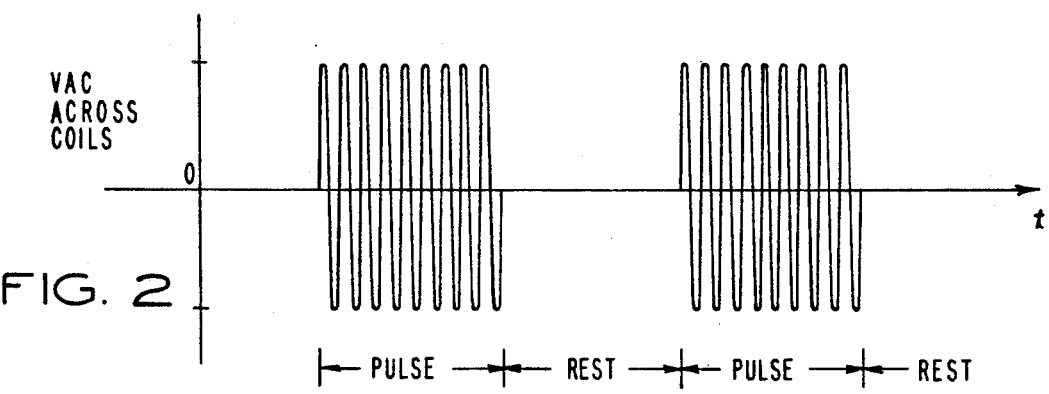
FIG. 2 is a timing waveform which illustrates the application of 60 Hz electrical power across the solenoid coils during duty cycles which are separated by rest cycles.
Figure 5:
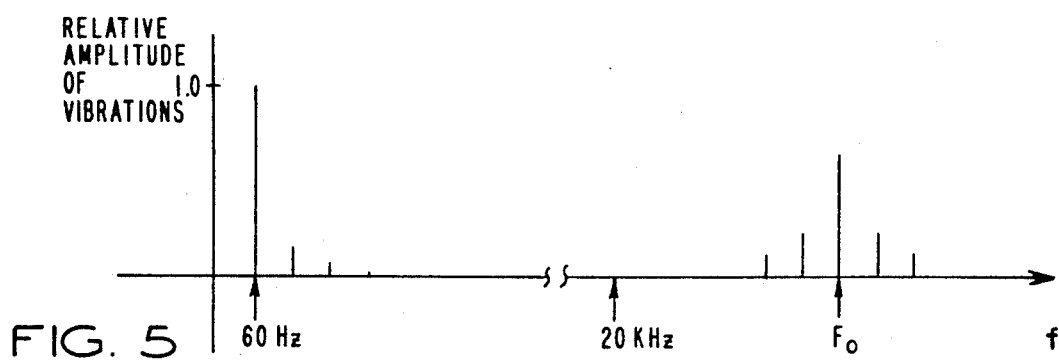

Because the solenoid bar 30 is constructed of a ferromagnetic metal, it undergoes magnetostriction in response to the reversing magnetic field. The voltage is applied across the coils 24, 26 and 28 during a pulse duty cycle as shown in FIG. 2. The pulse duty cycle may be of any desired interval, for example one to two minutes. The rest cycle may also be of any desired interval, for example one to two minutes. In response to the alternating magnetic field, the solenoid bar 30 produces vibrations at 60 Hz, and the magnetostriction effect produces ultrasonic vibrations at a frequency $F_o$ in the ultrasonic range, as shown in FIG. 5.

The pulse duty cycle and the rest interval are controlled by a timer 42 which is connected to be self-resetting. Preferably, the timer 42 is an integrated circuit digital timer, for example National Type NE556. The timer 42 produces a cycling output signal 44 at a predetermined duty cycle frequency when activated. The timer has an output Q which is coupled through a resistor R1 to the gate 36 of the power triac switch SW1. The duty cycle and rest cycle are determined by selection of a timing circuit which includes the resistors R1, R2 and C1. The resistors R1, R2 form a voltage divider, with the divider voltage being applied to the trigger input of the timer 42. In one arrangement, the values are chosen so that the capacitor C1 charges to the divider voltage in about two minutes, and discharges in about two minutes. By this arrangement, a high output signal 44 appears at the Q output of the timer 42 for causing conduction of the triac power switch SW1 for two minutes out of each four minute operating cycle.

Operating power for the timer 42 is provided by a step down transformer T1, which has a primary winding connected across the hot power conductor 18 and the neutral power conductor 20. The voltage is stepped down across a secondary winding to approximately 18 VAC, and is rectified by a full wave bridge rectifier BR1. The DC output of the bridge rectifier BR1 is approximately +18 volts DC, which is applied to the input of a voltage regulator 46. The output of the bridge rectifier BR1 is smoothed by an electrolytic capacitor C2. The regulator 46 has a well regulated +5 volts DC output, which is applied to the DC power input terminal of the timer 42.

In the preferred embodiment, the solenoid bar 30 was constructed of cold rolled ferromagnetic steel having a diameter of 0.75 inch and a length of about 14 inches. Each coil 24, 26 and 28 includes 2,150 turns of 26 AWG copper wire. Other solenoid bar lengths may be used, depending on the application. For example, for ground installations, I prefer to use a bar length of 22 inches.

According to another aspect of the invention, the length and diameter of the solenoid bar 30 are selected so that its natural frequency of vibration is in harmony with the frequency of the alternating electromagnetic field applied to the coils 24, 26 and 28 so that resonance will occur. As used herein, "in harmony with" means that the natural frequency of vibration of the solenoid bar 30 is within about ±10 percent of the frequency of the alternating electromagnetic field. According to this arrangement, the amplitude of vibrations is intensified by selecting the length and diameter of the solenoid bar so that its natural frequency of vibration is in the range of from about 50 Hz to about 70 Hz, substantially in resonance with the electromechanical driving frequency.

Intensification of the ultrasonic sound waves produced by magnetostriction is achieved by selecting the length and diameter of the solenoid bar 30 so that its natural frequency of vibration is in harmony with the ultrasonic frequency of magnetostriction. For magnetostriction ultrasonic frequency noise of about 23 kHz, the amplitude of the ultrasonic sound waves will be intensified if the length and diameter of the solenoid bar are selected so that its natural frequency of vibration is in the range of from about 20 kHz to about 25 kHz, substantially in resonance with the ultrasonic frequency.

The effectiveness of the low frequency component (60 Hz) and the high frequency magnetostriction component (ultrasonic) will be greater if the noise occurs randomly during the pulsing duty cycle. That is, the low frequency and high frequency components should be unpredictable and should not form a pattern which can be recognized by rodents which would become accustomed to the noise because of its regularity. This random effect is achieved according to one aspect of the present invention in which a pseudo-random signal generator 50 controls the application of the turn on signal 44 to the gate 36 of the triac power switch SW1. In this arrangement, the signal generator 50 produces a pseudo-random sequence of bits 52 which are output from an internal shift register. The internal shift register is clocked by an external clock 54 which produces a clock signal $\phi$. The clock period should be at least twice the frequency of the applied AC power, for example 120 Hz (2$f$). A suitable pseudo-random noise generator circuit is available from National in a mini-DIP package (National MM5437).

Figure 3:
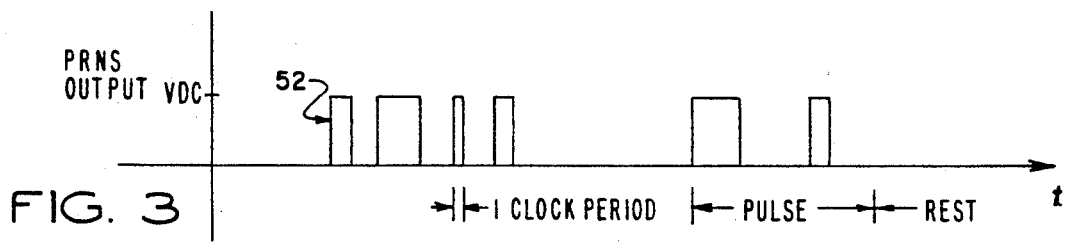
FIG. 3 is a timing waveform showing the output of the pseudo-random noise signal generator of FIG. 1.

The output 52 of the pseudo-random noise signal generator 50 is shown in FIG. 3. The output pulses 52 occur according to a pseudo-random function of time, and can be constructed so that a repeating pattern does not occur for many years. Accordingly, for the purposes stated herein, the pseudorandom noise signal output pulses can be considered to be unpredictable.

Figure 4:
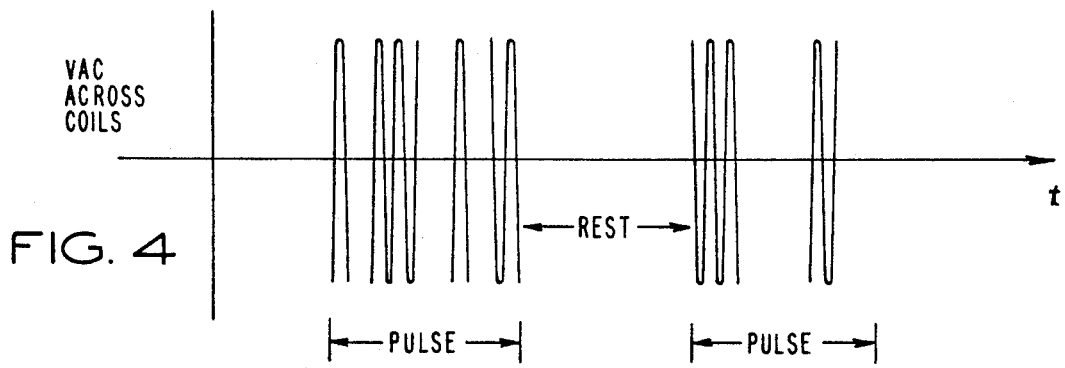
FIG. 4 is a timing waveform which shows the application of AC electrical power to the solenoid coils as gated by the pseudo-random noise signal generator; and, FIG. 5 is a diagram which shows the relative amplitude of vibrations as a function of frequency for the sound wave generating circuit of FIG. 1.

The pseudo-random noise signal output pulses 52 are coupled to one input of an AND gate 56. A second input of the AND gate 56 receives the output signal 44 of the timer 42. By this arrangement, the enabling output signal 44 from the timer 42 is coupled to the gate 36 of the power switch SW1 only when there is coincidence with the pseudo-random noise signal pulses 52. The AND gate 56 thus produces a series of output pulses 58 which occur as a pseudo-random function of time. The output pulses 58 are amplified by a driver circuit 60, which is electrically connected to the gate 36 through a coupling resistor R3. Thus, during a pulsing duty cycle, the power switch SW1 is gated on and off synchronously with the pseudo-random noise signal pulses 52. The coils are energized on a pseudo-random basis as shown in FIG. 4. Accordingly, the solenoid bar 30 is vibrated on a pseudo-random basis, so that the offensive noise signals occur unexpectedly and unpredictably.

In the preferred embodiment, the component values are as follows:

| Component | Value |
|---|---|
| Resistor R1 | 680 K ohms |
| Resistor R2 | 680 K ohms |
| Resistor R3 | 68 ohms |
| Capacitor C1 | 1.0 microfarad |
| Capacitor C2 | 470 microfarad |

Although the invention has been described and illustrated with respect to a preferred embodiment, it should be understood that the present disclosure has been made by way of example only and that changes in the arrangement and combination of parts may be made by those skilled in the art without departing from the spirit and scope of the invention as claimed.

What is claimed is:

1. Apparatus for repelling rodents from a building having an AC wiring power distribution system including a hot conductor, a neutral conductor and a ground conductor electrically connected to a common AC service receptacle of the type having jacks for receiving plug prongs, said apparatus comprising:
   a housing;
   at least one coil in said housing operable to generate sound waves offensive to rodents when alternately energized and deenergized by an alternating electromagnetic field at a predetermined frequency;
   a plug adapted to be received by the receptacle, said plug having a first pair of prongs for establishing electrical connection with the hot and neutral power conductors and a ground prong for establishing electrical connection with the ground conductor when the plug prongs are inserted into the AC service receptacle jacks;
   an electrical circuit connected between the hot and neutral prongs, said circuit including said coil therein and operable to effect energization of the coil when said plug is inserted into an active AC service receptacle and said circuit is completed;
   frequency control means for alternately completing and interrupting said circuit at a predetermined frequency;
   an elongated bar disposed within said coil, said elongated bar having first and second end portions; and,
   a first wiring conductor having a first end portion attached to the first end portion of said bar and having a second end portion attached to one of the prongs of said plug.

2. Apparatus for repelling rodents as set forth in claim 1, including a second wiring conductor having a first end portion attached to the second end portion of said bar, said second wiring conductor having a second end portion adapted for mechanical connection to an external sonic radiator.

3. Apparatus for repelling rodents as defined in claim 1, including a first resilient spring of conductive metal connecting the first end portion of the first wiring conductor to the first end portion of said bar.

4. Apparatus for repelling rodents as defined in claim 1, including a second resilient spring of conductive metal attached to the second end portion of said bar for accommodating mechanical connection of said bar to an external sonic radiator.

5. Apparatus for repelling rodents as defined in claim 1, said circuit means including:
   a gate controlled switch connected in series with said coil and operable to complete said electrical circuit in a power conducting condition of the switch and to interrupt the circuit in a non-conducting condition of said switch;
   a timing circuit for providing a cycling output signal at a predetermined frequency when activated, said timing circuit having an output for driving the gate of said switch; and,
   means for applying said cycling output signal to the gate of said switch to alternately effect the conducting and non-conducting switch conditions during a duty cycle period and a rest cycle period, respectively.

6. Apparatus for repelling rodents as defined in claim 5, including:
   a noise signal generator operable to produce output signals which occur according to a pseudo-random function of time; and,
   an AND gate having first and second inputs coupled to the output of the pseudo-random noise signal generator and the output of said timing circuit, respectively, said AND gate having an output coupled to the gate of said gate controlled switch.

7. Apparatus for repelling rodents as defined in claim 1, wherein said bar is constructed of a ferromagnetic metal which undergoes magnetostriction in the presence of an alternating magnetic field.

8. Apparatus for repelling rodents as defined in claim 1, the length and diameter of said bar being selected so that its natural frequency of vibration is in harmony with the frequency of the alternating electromagnetic current applied to said coil.

9. Apparatus for repelling rodents as defined in claim 1, wherein said bar is constructed of a feromagnetic metal which undergoes magnetostriction in the presence of an alternating magnetic field, thereby causing sound waves at an ultrasonic frequency to be generated as the magnetic domains of the ferromagnetic material within said bar alternately align with the north and south magnetic poles produced by the alternating magnetic field, wherein the length and diameter of said ferromagnetic bar are selected so that its natural frequency of vibration is in harmony with the ultrasonic frequency of magnetostriction.

10. Apparatus for energizing a sonic radiator for the purpose of repelling rodents comprising, in combination:
    a housing;
    at least one coil in said housing operable to generate an alternating electromagnetic field when energized by AC power;
    an electric circuit adapted for receiving power from an AC power source, said circuit including said coil therein and operable to effect energization of the coil when said circuit is completed;
    an elongated bar disposed within said coil, said elongated bar having first and second end portions; and,
    a sonic conductor having a first end portion attached to the first end portion of said bar and having a second end portion adapted for attachment to a sonic radiator.

11. Apparatus for repelling rodents as defined in claim 10, including a resilient metal spring connecting the first end portion of said sonic conductor to the first end portion of said bar.

* * * * *